United States Patent [19]

Donavich

[11] Patent Number: 4,631,891
[45] Date of Patent: Dec. 30, 1986

[54] FLOOR CONSTRUCTION FOR CARGO CARRIERS

[75] Inventor: John Donavich, Des Plaines, Ill.

[73] Assignee: Transamerica Distribution Services, Inc., Chicago, Ill.

[21] Appl. No.: 690,113

[22] Filed: Jan. 9, 1985

[51] Int. Cl.⁴ .......................... B61D 3/00; F04C 1/30
[52] U.S. Cl. ....................................... 52/588; 52/732; 105/375
[58] Field of Search ............... 52/588, 579, 729, 732, 52/630, 177; 105/375

[56] References Cited

U.S. PATENT DOCUMENTS

| | | | |
|---|---|---|---|
| 1,271,413 | 6/1918 | Allen | 105/375 |
| 2,753,018 | 7/1956 | Curell | 52/588 X |
| 2,786,556 | 3/1957 | Constance, Jr. | 52/588 |
| 2,923,384 | 2/1960 | Black | 52/588 |
| 2,952,341 | 9/1960 | Weiler | 52/588 |
| 3,046,852 | 6/1962 | Graham | 52/588 |
| 3,075,802 | 1/1963 | Lowe . | |
| 3,110,371 | 11/1963 | Deridder | 52/588 |
| 3,116,950 | 1/1964 | Chieger et al. | 52/588 |
| 3,128,851 | 4/1964 | Deridder et al. | 52/588 |
| 3,152,669 | 10/1964 | Johnston . | |
| 3,229,438 | 1/1966 | Flagan | 52/588 |
| 3,269,072 | 8/1966 | Black | 52/588 X |
| 3,368,315 | 2/1968 | Thurnau | 52/588 |
| 3,416,280 | 12/1968 | Young | 52/588 |
| 3,440,780 | 4/1969 | Adam et al. | 52/588 X |
| 3,555,762 | 1/1971 | Costanzo, Jr. | 52/588 |
| 3,884,328 | 5/1975 | Williams | 52/588 X |
| 3,986,310 | 10/1976 | van de Broek | 52/588 X |
| 4,091,743 | 5/1978 | Lemon | 52/588 X |

*Primary Examiner*—J. Karl Bell
*Attorney, Agent, or Firm*—Brumbaugh, Graves, Donohue & Raymond

[57] ABSTRACT

A cargo supporting floor particularly suited for refrigerated trucks or other carriers is formed of a plurality of interlinked panels, each panel being integrally formed with at least one longitudinally extending T-shaped member and at least one parallel, longitudinally extending inverted U-shaped channel. The panels are extruded from a suitable material such as aluminum and are formed with interlocking edges so that the individual panels may be firmly joined to one another. Various combinations of T-shaped members and U-shaped channels are available, to combine the air circulation effectiveness of the T-shaped member with the load carrying capacity of the channel member as needed for particular conditions of use.

8 Claims, 6 Drawing Figures

FLOOR CONSTRUCTION FOR CARGO CARRIERS

FIELD OF THE INVENTION

This invention relates to floor structures for trucks, railway cars and the like, and more particularly to such floor structures providing optimum structural strength and air circulation.

BACKGROUND OF THE INVENTION

Trucks, trailers, containers and railway cars employed in the transportation of goods requiring refrigeration, e.g., frozen foods, or heat, consist generally of an insulated, enclosed compartment and a refrigeration unit which supplies cold air or heat to the compartment. To maintain the proper temperature at all of the cargo carried within the compartment, it is necessary to circulate cold or heated air beneath the cargo, as well as around its sides and top. To achieve this air circulation, the floors of such compartments are generally formed with air passages below the load carrying surfaces, such that air can flow below the cargo resting on the floor.

In one common configuration of such a floor, the floor is made up of a number of interconnecting panels, each of which consists of a generally flat base from which a plurality of parallel-spaced T-shaped members extend upwardly, the horizontal top flanges of the members all lying in the same plane to support the goods being carried. The spaces between the parallel T-shaped rails or members allow for good air circulation beneath the goods. However, this type of floor structure is limited in load carrying capacity, and is subject to crumpling under heavy stresses, such as may be imposed upon it by a forklift or similar loading vehicle entering the compartment, or dropping of a heavy crate. Moreover, because of the horizontal flanges, loose pieces of the cargo and scraps of other material tend to catch under and wedge between the T-shaped members, making cleaning of the floor difficult.

Another commonly used floor construction for refrigerated cargo compartments is made up of interconnecting panels, each of which is formed with a plurality of parallel-spaced inverted U-shaped channel members. Because of the box-like configuration of the inverted U-channels, this type of floor provides better structural strength than the floor formed of T-shaped members, but suffers the disadvantage that air flow beneath the cargo being carried is limited, since no air can circulate effectively beneath the horizontal load bearing surfaces of the inverted U-shaped channels.

Efforts have been made in the past to mitigate the respective disadvantages of the T-shaped and U-shaped floor sections discussed above. Thus, as described in U.S. Pat. No. 3,416,280 to Young, contoured inserts are slipped in between the T-shaped members of the floor construction to add rigidity where needed. The constructions shown in U.S. Pat. Nos. 3,128,851 to DeRitter et al, and 4,019,743 to Lemmon, employ relatively narrow U-shaped channels topped with horizontal flanges in an effort to overcome the advantages of the T-shaped members and the inverted U-shaped channels when used alone. However, neither avoids all of the disadvantages enumerated above and, furthermore, are more complex and expensive to manufacture than simple T-shaped or U-shaped floor sections.

SUMMARY OF THE INVENTION

The present invention overcomes the disadvantages of the conventional T-shaped and U-shaped configurations of truck floors by combining, in a single panel, at least one T-shaped member and one U-shaped member adjacent one another. By interlinking a number of such panels to form the floor of the compartment, an optimum combination of structural strength and air circulation is achieved. In accordance with the invention, each panel may have one or more inverted U-shaped channels (DUCTs), and one or more T-shaped members (TEEs), depending upon the structural strength and air flow requirements of the particular application. Moreover, panels of different configurations may be combined in a single floor to provide increased structural strength at those locations where higher loads are expected, while maximizing air circulation at other locations.

The panels may be formed in conventional manner, e.g. by extrusion, and may be of aluminum or any other suitable material. The edges of the panels are formed with appropriate interlocking means which firmly interconnect a plurality of the panels to form the truck floor.

BRIEF DESCRIPTION OF THE DRAWINGS

The foregoing and other objects, features and advantages of the present invention will become apparent from the following detailed description thereof when taken in conjunction with the appended drawings in which.

DETAILED DESCRIPTION OF THE INVENTION

Figure 1:
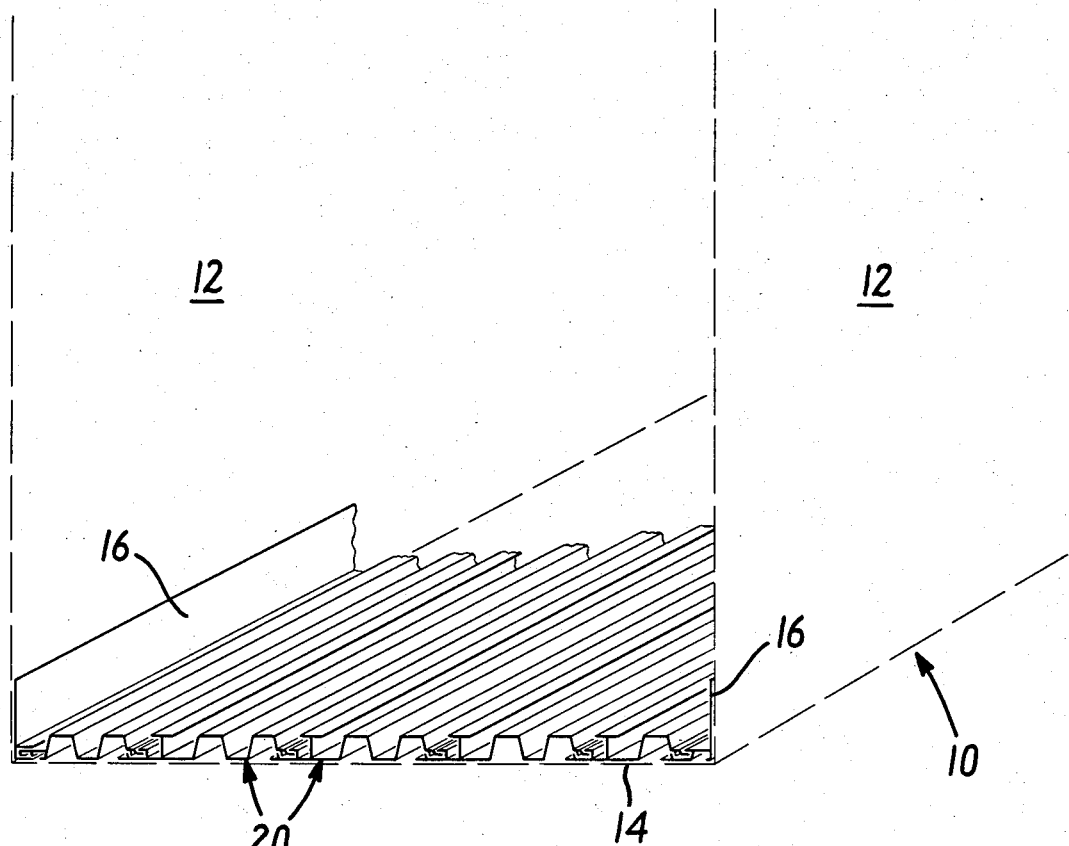
FIG. 1 is a schematic view of a vehicle compartment showing a floor construction in accordance with the present invention.

Turning now to the drawings, the numeral 10 (FIG. 1) indicates the cargo compartment of a truck, trailer, container, railway car or other vehicle in which the invention is used. The side walls of the compartment are indicated generally at 12 and the floor at 14. Resting directly on or spaced slightly above the floor 14 of the cargo compartment are a series of elongated panels 20, interlinked to cover the width of the compartment and extending lengthwise to provide a floor for the entire compartment. As illustrated in FIG. 1, and as will be described in detail below, the individual panels 20 are formed with a cross-section comprising both T-shaped members and inverted U-shaped channels, integrally joined at their lower-most edges by webs, and having their upper-most surfaces lying in a common plane. Cartons or crates or other cargo to be carried will rest on these upper-most surfaces, with the elongated channels between them permitting refrigerated air to circulate beneath the cargo.

The floor configuration illustrated schematically in FIG. 1 embodies a form of the invention referred to as the "TEE-DUCT-DUCT" format, "TEE", of course, referring to the T-shaped member, and "DUCT" referring to the inverted U-shaped channel member. For simplicity, the terms "TEE" and "DUCT" will be used hereafter to denote these members in the various configurations described.

Figure 2:
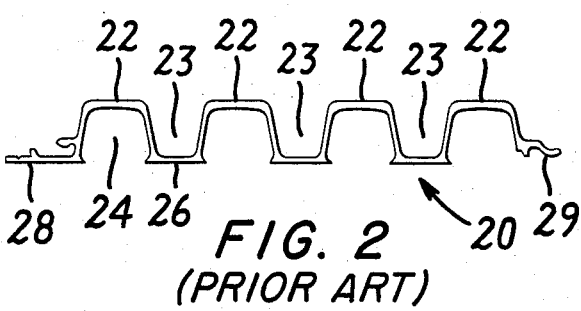
FIGS. 2 and 3 illustrate, for purposes of comparison, prior art inverted U-shaped channel and T-shaped member configurations respectively.

To better appreciate the structure and advantages of the present invention, a brief reference to conventional floor constructions will be helpful. In FIG. 2, a conventional all DUCT floor panel is illustrated. Each of the several panels 20 forming the floor consists of a plurality of parallel, longitudinally extending DUCTs 22 integrally connected at their lower-most edges by webs 26. The longitudinal edges of each of the panels are formed with interlocking members 28 and 29, whereby several panels may be joined to form the complete floor. As will be understood, the DUCTS 22 provide relatively broad load supporting surfaces at their upper-most extremities, and the double side walls of the DUCT provide good load carrying capacity. However, while the longitudinal channels 23 between the DUCTs permit air to circulate beneath cartons or crates supported on the DUCTs, the hollow spaces 24 within the DUCTs are not open for air circulation. Thus, the all DUCT configuration of FIG. 2, while providing good load carrying capacity, suffers from reduced air circulation.

Figure 3:
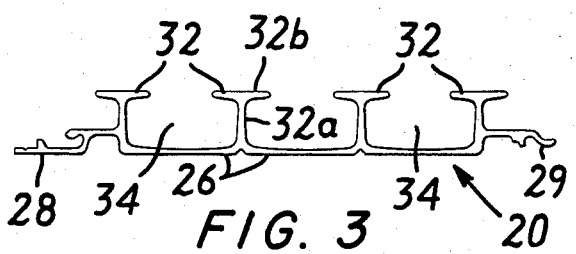

The latter fault of the all DUCT configuration is remedied by the commonly used all TEE configuration, illustrated in FIG. 3. In this conventional construction, each panel 20 consists of a plurality of TEEs 34 extending upwardly from a base web 26. Each of the TEEs includes a vertical web 32a and a horizontal flange 32b, the upper-most surfaces of the latter providing the load-bearing surfaces for the cargo. As can be seen, the spaces 34 between the TEEs permit air circulation beneath substantially all of the cargo supported on them, and thus this configuration provides effective cooling for the cargo. However, the slender webs 32a of the TEEs are of relatively limited structural rigidity and overloading, or the impact of cargo loading vehicles on the floor, frequently results in collapse of one or more of the TEEs, thereby reducing the load carrying effectiveness of the floor. Moreover, because of the flange constuction, broken off pieces of the cargo or other debris can be readily wedged within the spaces 34, making cleaning of the floor more time consuming and costly as compared, for example, with the DUCT floor of FIG. 2.

Figure 4:
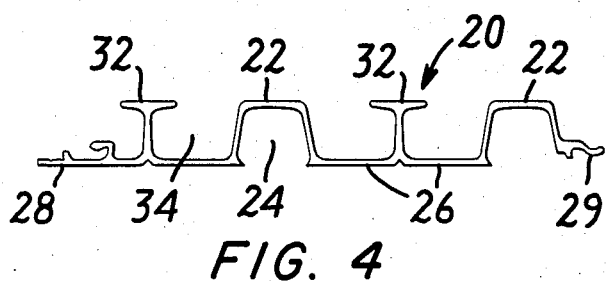
FIGS. 4, 5 and 6 show in cross-section, three embodiments of floor panels in accordance with the present invention.
Figure 5:
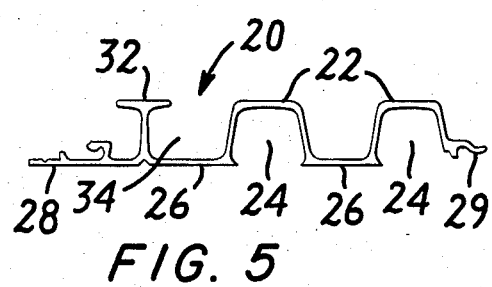
Figure 6:
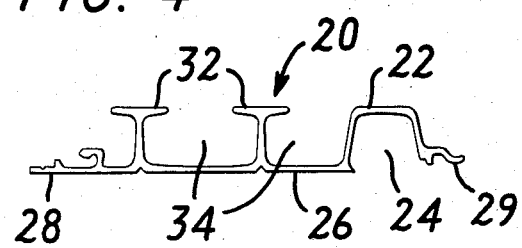

The deficiencies in cooling effectiveness and/or load carrying capacity of conventional TEE or DUCT floor arrangements are overcome by the present invention which combines the load carring capacity of the DUCT with the cooling effectiveness of the TEE, as shown in FIGS. 4, 5 and 6. In accordance with the invention, each panel of cargo-supporting floor is integrally formed, such as by extrusion, of a suitable material, e.g., aluminum, and includes at least one longitudinally extending TEE and one longitudinally extending DUCT parallel to and adjacent one another. Longitudinal interlocking means 28 and 29 are provided along the respective edges of each panel to enable successive panels to be firmly interlinked to each other to form the complete floor. Suitable end sections 16 (FIG. 1) serve to secure the floor within the compartment and provide a watertight seal.

One form of floor panel according to the invention is illustrated in cross-section in FIG. 4. As shown, the panel 20 is of the TEE-DUCT-TEE-DUCT configuration, i.e. alternating TEEs and DUCTs, which provide effective air flow in the spaces 34 combined with structural rigidity provided by the DUCTs 22.

In the embodiment illustrated in FIG. 5, additional structural rigidity is provided by using a TEE-DUCT-DUCT configuration. The two adjacent DUCTs provide a longitudinal band of high strength extending the length of the cargo floor, which could be located, for example, to accommodate the wheels of a fork lift or other cargo loading vehicle or to support heavy spot loads.

Where a more moderate increase in strength is required, the TEE-TEE-DUCT configuration of FIG. 6 may be suitable. In this embodiment, the adjacent TEEs provide greater cooling flow while the DUCT increases overall strength as compared with the all TEE arrangement. This format lessens the likelihood of damage to the cargo floor from dropped crates or momentary overloads while providing good air circulation.

Preferably, in accordance with the invention, the various panels, each of which includes at least one TEE and one DUCT in side-by-side relationship, may be interlinked with one another in any desired pattern dictated by the load to be carried, the loading equipment to be used and the air circulation required for the cargo. Thus, for example, the TEE-DUCT-DUCT configuration of FIG. 5 may be located so as to accommodate the wheels of a forklift truck while the panels in between may be of the same configuration or that of FIG. 4 or FIG. 6.

It will be apparent that various other configurations of floor panels embodying the spirit of the invention will occur to those skilled in the art. For example, panels having the following configurations may be fabricated, the common feature being that each panel includes at least one TEE and one DUCT, side by side, between its edges:
1. DUCT-DUCT-TEE-TEE;
2. TEE-TEE-TEE-DUCT;
3. DUCT-DUCT-DUCT-TEE-TEE-TEE;
4. TEE-TEE-DUCT-DUCT-DUCT;
5. DUCT-DUCT-DUCT-DUCT-TEE-TEE-TEE-TEE.

Accordingly, the invention is to be limited only by the scope of the appended claims.

We claim:

1. For use in a cargo carrier having a floor, such as a truck, trailer, container, railway car or the like, a cargo supporting structure comprising an integrally formed panel, said panel having:
   at least one longitudinally extending T-shaped member comprising a vertical web and a horizontal flange extending along the upper edge of said vertical web;
   at least one longitudinally extending inverted U-shaped channel member parallel to said T-shaped member, said channel member having a pair of downwardly extending substantially vertical side walls; and
   web means for resting on said floor of said cargo carrier interconnecting the lowermost edge of the vertical web of said T-shaped member and the lowermost edge of one of said side walls of said inverted U-shaped channel member nearest said vertical web along the entire lengths of said members, the uppermost surfaces of said T-shaped member and said inverted U-shaped channel member being cargo supporting surfaces.

2. The floor structure of claim 1 wherein said panel includes three or more parallel, longitudinally extending members, at least two of said members being on one of said T-shape or inverted U-shape and at least one of said members being of the other of said shapes, and web means interconnecting the nearest lowermost edges of each adjacent pair of said members.

3. The floor structure of claim 2 wherein said panel includes only three longitudinally extending members, two of said members being T-shaped and the remaining member being inverted U-shaped.

4. The floor structure of claim 2 wherein said panel includes only three longitudinally extending members, two of said members being inverted U-shaped and the remaining member being T-shaped.

5. The floor structure of claim 1 wherein said panel includes three or more parallel, longitudinally extending members alternatively of said T-shape and said inverted U-shape, and web means interconnecting the nearest lowermost edges of each adjacent pair of said members.

6. The floor structure of claim 1 wherein said panel includes four or more parallel, longitudinally extending members, at least two of said members being of one of said T-shape or inverted U-shape and at least two of said members being of the other of said shapes, and web means interconnecting the nearest lowermost edges of each adjacent pair of said members.

7. The floor structure of claim 1 wherein the uppermost surfaces of said T-shaped member and said inverted U-shaped channel member lie in a common plane.

8. For use in a cargo carrier having a floor, such as a truck, trailer, container, railway car or the like, a cargo supporting structure comprising:
   a plurality of integrally formed panels joined together, each of said panels having
      at least one longitudinally extending T-shaped member comprising a vertical web and a horizontal flange extending along the upper edge of said vertical web;
      at least one longitudinally extending inverted U-shaped channel member parallel to said T-shaped member, said channel member having a pair of downwardly extending substantially vertical side walls;
      web means for resting on said floor of said cargo carrier interconnecting the lowermost edge of the vertical web of said T-shaped member and the lowermost edge of one of said side walls of said inverted U-shaped channel member nearest said vertical web along the entire lengths of said members, the uppermost surfaces of said T-shaped member and said inverted U-shaped channel member being cargo supporting surfaces; and
   means disposed along the outer edges of said panel for interlocking with others of said panels, said panels thereby being adapted to be joined together to form said cargo supporting structure.

* * * * *